United States Patent Office 3,043,786
Patented July 10, 1962

3,043,786
OXIDIZED TALL OIL AND PETROLEUM OIL COMPOSITION, METHOD OF MAKING, AND METHOD OF RECLAIMING RUBBER THEREWITH
Chester M. White, Rochester, N.Y., assignor to Olin Mathieson Chemical Corporation, a corporation of Virginia
No Drawing. Filed Oct. 22, 1958, Ser. No. 768,827
7 Claims. (Cl. 260—2.3)

This invention relates to a novel composition useful in the reclaiming of vulcanized rubber and the process of making it.

Several processes are widely known for reclaiming vulcanized rubber. In the alkali reclaiming process, which is particularly suitable for reclaiming vulcanized natural rubber, the scrap is digested under pressure for a considerable time with caustic alkali. In the neutral process, the scrap is digested with zinc chloride or calcium chloride solution. The acid process comprises digestion with 15 to 25 percent by weight sulfuric acid for several hours. However, difficulties are encountered in all of these processes in obtaining reclaimed scrap having the desired properties.

The addition of tall oil in the alkali, neutral or acid processes has previously been known to produce improved results, particularly with respect to tackiness and acceleration of the cure during subsequent vulcanization. Crude tall oil is a by-product of the paper pulp industry and consists of about 50 percent by weight resin acids, e.g., abietic acid; 40 percent by weight fatty acids, e.g., oleic and linoleic acids; and, about 10 percent by weight unsaponifiable material, e.g., sterols and high molecular weight aliphatic alcohols. However, on standing, crude tall oil forms a semi-solid non-homogeneous mass and separates into a relatively fluid upper layer and a solid or semi-solid lower layer. This behavior of crude tall oil is a serious disadvantage in its use in reclaiming rubber, since, in order to obtain its desirable effects, such separated tall oil must be homogenized in some way before introducing it into the reclaiming process.

In order to overcome the defects inherent in crude tall oil and to make it more readily utilized in the reclaiming of either natural or synthetic vulcanized rubber, various expedients have been suggested. The tall oil has been diluted with various petroleum oils in an effort to overcome the tendency to crystallize on standing. Most petroleum oils, however, are poor solvents for the crystallizable constituents of the crude tall oil and do not provide a satisfactory solution to the problem. Tall oil has also been over-neutralized or partially neutralized with alkalies or with organic amines in an effort to overcome the crystallization problems and effect some improvement. However, the resin acids, particularly the abietic acids, present in the tall oil function most effectively in the rubber reclaiming process and interfere least with the subsequent vulcanization of the rubber when they are present as free acids.

It has now been found that, if tall oil is lightly oxidized under controlled conditions and if the oxidized tall oil concentrate is diluted with a suitable petroleum oil, the resulting composition retains all the properties of the tall oil and its free resin acids which are desirable with respect to natural or synthetic vulcanized rubber reclaiming processes and, further, does not crystallize on long storage at low temperatures.

The process of the present invention includes heating and air blowing tall oil at about 100° C. to 150° C. for about 8 to 24 hours in the absence or presence of a catalyst and diluting the resultant oxidized tall oil concentrate with a naphthenic base oil having a viscosity in the lubricating oil range of viscosities.

The tall oil employed in the present process can be crude, refined or a mixture of the two. The air-blowing, on the other hand, is preferably continued until the viscosity of the oxidized tall oil concentrate is about 350 to 700 centistokes at 100° F. Thus, for example, an air rate of about 500 to 1000 milliliters per minute at 120° C. to 130° C. will produce such a viscosity in a 400 gram batch of tall oil in from 12 to 24 hours. When the oxidation is insufficient to raise the viscosity to at least about 350 centistokes at 100° F., the oxidized tall oil concentrate is insufficiently treated and may crystallize from the diluted composition on storage, thereby rendering it unsuitable for use in the rubber reclaiming processes. On the other hand, the oxidation should be discontinued before the viscosity is greater than about 700 centistokes at 100° F., since higher viscosities produce unsatisfactory results in the reclaiming process.

Catalysts which are useful in the heating step of the process of the invention are metallic salts of organic acids, e.g., fatty acids, such as the napththenates of cobalt, copper, manganese or zinc, and polyethylene polyamines, such as triethylene tetramine and tetraethylene pentamine. The compounds appear to catalyze the viscosity rise. This appears to be one of the indicia of the stability against crystallization in the naphthenic base oil-diluted compositions of the present invention.

As already noted, the oxidation step of the present process raises the viscosity of the tall oil and, suitably, the viscosity level of the oxidized tall oil concentrate is from about 350 to 700 centistokes at 100° F. Viscosities of about 500 to 640 centistokes at 100° F. are preferred, since dilution of the concentrate with the naphthenic base oil at such a point produces a reclaiming oil of suitable viscosity, e.g., about 250 to 600 centistokes at 100° F., and one which is easily stored, handled and charged to the reclaiming processes.

The dilution step of the present process is carried out so as to achieve compositions containing from about 80 to 95 percent by weight of the oxidized tall oil concentrate and the remainder naphthenic base oil of lubricating oil viscosity. A preferred naphthenic base oil diluent has the following characteristics:

Viscosity at 100° F. SUV _____ 60 to 100
Flash point, ° F., min. (C.O.C.) _____ 275
Fire point, ° F., min. (C.O.C.) _____ 300
Pour point, ° F., max. _____ —20
Neutralization number, max. _____ 0.20

The compositions of the present invention are homogeneous liquids which do not crystallize or separate on long storage at low temperatures. They are, primarily, liquid rosin and have an acid value of at least 120, compared with the acid value of about 167 of the original tall oil. Therefore, they retain the rosin acids in the form most advantageous with respect to vulcanized rubber reclamation processes, especially the alkali and acid processes. They have a desirable accelerating effect on the reactions taking place in such processes and they imbue the reclaimed rubber with improved properties of plasticity and absence of tackiness. They also improve subsequent cure during vulcanization and, at the same time, minimize scorching or overcure at elevated temperatures. The resulting reclaimed rubber also has improved resistance to flexing which is particularly important in synthetic tire tread of the GR-S type. Preferably, they are added to digester charges in proportions of 125 pounds of the composition for 10,000 pounds of scrap rubber. This proportion can be varied over a range of about 0.5 to 2.5 percent by weight to give a suitable plasticity without over-softening the rubber.

For a better understanding of the present invention reference should be had to the following examples:

Example I

A batch of 3250 grams of tall oil was heated at 120° C. to 125° C. for 15 hours while air was blown through the oil at the rate of 500 milliliters per minute. The resulting oxidized tall oil concentrate was blended with a naphthenic base oil in the proportion of 90 parts by weight concentrate and 10 parts by weight naphthenic base oil. The naphthenic base oil had the following characteristics:

| | |
|---|---|
| Viscosity at 100° F., SUV | 78 |
| Flash point, ° F., (C.O.C.) | 310 |
| Fire point, ° F. (C.O.C.) | 345 |
| Specific gravity at 20° F | 0.896 |
| Boiling point, ° F ca | 600 |

The diluted product had a viscosity of 306 centistokes at 100° F., an acid number of 146, and was suitable for use in the reclamation of rubber.

Example II

Another sample of 1000 grams of tall oil was air-blown for 11 hours at 100° C. to 125° C. using 500 milliliters of air per minute. The resultant oxidized tall oil was blended in the proportions of 90 parts by weight of concentrate to 10 parts by weight of the naphthenic base oil described in Example I. The diluted product had a viscosity of 290 centistokes at 100° F. and was suitable for use in the reclamation of rubber.

Example III

Tall oil was blown with air at a temperature of 120° C. to 130° C. for 24 hours using one liter per minute of air for the 400 grams of tall oil charged. The viscosity of the oxidized tall oil concentrate was 815 centistokes at 100° F. When blended with the naphthenic base oil described in Example I in the proportion of 85:15 by weight, the diluted product was suitable for use as a rubber reclaiming oil.

Example IV

A charge of 400 grams of tall oil to which was added 0.1 percent by weight of zinc naphthenate was blown with air at the rate of 1 liter per minute at a temperature of 120° C. to 130° C. for 12 hours. The resulting oxidized tall oil concentrate had a viscosity of 617 centistokes at 100° F. and, when blended in the proportion of 90:10 by weight with the naphthenic base oil of Example I, yielded a diluted product suitable for use in the reclamation of rubber.

Example V

A steam-jacketed kettle was charged with 10,000 pounds of finely ground GR-S rubber scrap free from fabric, 200 pounds of the diluted product of Example IV, and 500 pounds of solvent naphtha. The mixture was digested for 8 hours at about 370° F. to 380° F. under 175 p.s.i., washed and dried.

What is claimed is:

1. A composition of matter useful in the reclamation of vulcanized rubber consisting essentially of from about 80 to 95 percent by weight based on the total composition of an oxidized tall oil concentrate having a viscosity of from about 350 to 700 centistokes at 100° F. and a diluent remainder of naphthenic base petroleum oil having a viscosity in the lubricating oil range of viscosities, the composition having a viscosity of from about 250 to 600 centistokes at 100° F. and an acid value of at least 120; said oxidized tall oil concentrate being produced by heating and air blowing tall oil at a temperature of about 100 to 150° C.

2. The composition of claim 1 in which the oxidized tall oil concentrate is produced by heating and air blowing the tall oil at about 100° C. to 150° C. for about 8 to 24 hours.

3. The composition of claim 2 in which the heating and air blowing are carried out in the presence of a catalyst promoting oxidation and viscosity increase.

4. The method of making a composition of matter useful in the reclamation of vulcanized rubber comprising heating and air blowing at a temperature of about 100° C. to 150° C. tall oil to produce an oxidized tall oil concentrate having a viscosity of from about 350 to 700 centistokes at 100° F. and diluting the concentrate with a naphthenic base petroleum oil having a viscosity in the lubricating oil range of viscosities to produce a composition having a viscosity of from about 250 to 600 centistokes at 100° F. and an acid value of at least 120 useful in the reclamation of vulcanized rubber, the concentrate being from about 80 to 95 percent by weight of the composition.

5. The method of claim 4 in which the heating and air blowing is to about 100° C. to 150° C. for about 8 to 24 hours.

6. In the reclamation of vulcanized rubber, the improvement comprising adding the composition of claim 1 to the vulcanized rubber being reclaimed in an amount of about 0.5 to 2.5 percent by weight of the said vulcanized rubber.

7. The composition of claim 1 in which the viscosity of the concentrate is from about 500 to 640 centistokes at 100° F.

References Cited in the file of this patent
UNITED STATES PATENTS

| | | |
|---|---|---|
| 2,714,071 | Van Valkenburgh | July 26, 1955 |
| 2,736,662 | Van Valkenburgh | Feb. 28, 1956 |
| 2,828,215 | Dunlap | Mar. 25, 1958 |
| 2,908,676 | Van Valkenburgh | Oct. 13, 1959 |